Patented Sept. 18, 1945

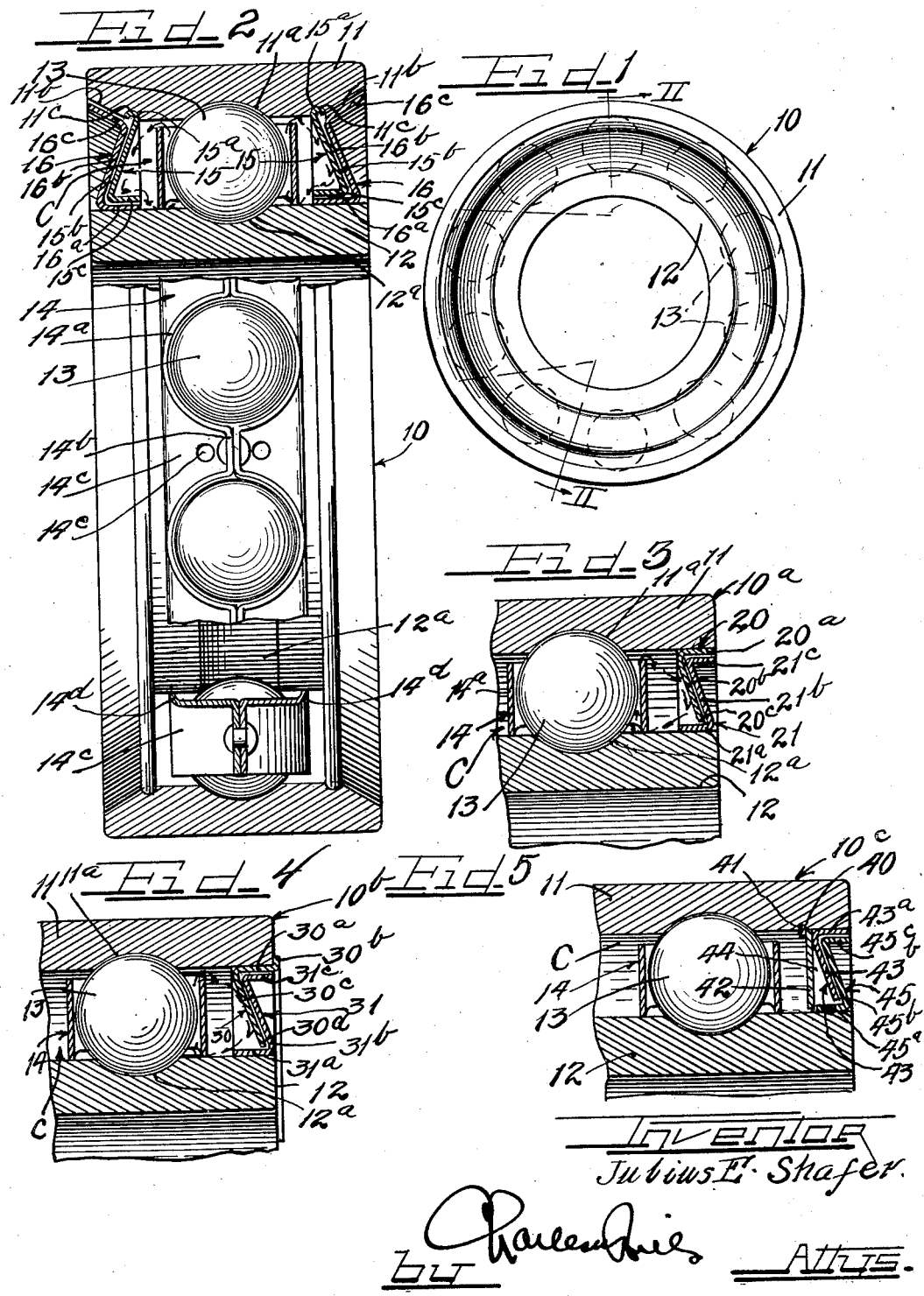

2,385,306

UNITED STATES PATENT OFFICE 2,385,306

BEARING SEAL CONSTRUCTION

Julius E. Shafer, Chicago, Ill.

Application June 8, 1942, Serial No. 446,200

8 Claims. (Cl. 308—187.2)

This application relates to seals and particularly to seals for bearings.

This application is a continuation in part of my copending application entitled: "Bearings," Serial No. 317,278 filed February 5, 1940.

In my above referred to parent application I have disclosed and claimed seal constructions for bearings wherein a seal ring extends inwardly from the outer race ring and a flinger assembly is disposed on the inner race ring to have close running clearance with the outer face of the sealing ring.

In accordance with the present invention outer race ring carried seal rings and inner race ring carried flinger assemblies are arranged to provide a narrow sealing passageway extending axially outward adjacent the inner race ring, thence radially outwardly and axially inwardly across the space between the inner and outer race rings and then axially outwardly adjacent the outer race ring. This passageway, being defined by stationary walls on one side and rotating walls on the other side, which walls are disposed in close running clearance, will efficiently prevent ingress of dirt into the bearing chamber and loss of lubricant from the bearing chamber because dirt and lubricant can only pass through the passageway against the action of gravity and centrifugal force. Thus, for example, the rotating flingers of this invention will throw off, by centrifugal force, any dirt in the vicinity of the entrance mouth to the passageway and at the same time will throw off lubricant attempting to enter the other end of the passageway. Therefore, both ends of the passageway will be kept open but, even though any material should enter the passageway, it must move along a tortuous path including at least two reverse turns which impede gravitational flow.

Since the relatively movable parts of the seal constructions of this invention are spaced apart, no friction is set up in the seal, no wear of parts is possible, and no heat is generated during operation.

The seals of this invention are especially well adapted for use in ball bearing assemblies having the balls seated in land type cages since lubricant in the ball chamber of such bearings is actually thrown by the flingers of the seals into the path of the rotating cage where it can readily enter the cage to lubricate the balls. The seal constructions therefore actually enhance lubrication of the anti-friction elements in bearing assemblies.

In one form of the invention the outer race ring carried seal ring can be snapped into a groove provided in the outer race ring and extend radially inward and axially outward toward the inner race ring. If desired the inner end of the seal ring can have an axially inwardly extending flange overlying the inner race ring. The flinger has a base pressed onto the inner race ring and extending under this flange. The terminal end of the flange and the terminal end of the flinger base are preferably flush with each other. The flinger has a flange overlying the ring in parallel relation thereto. The outer end of this flange preferably has an outturned portion in closely spaced relation to the outer race ring. The terminal end of this outturned portion is flush with the outer face of the race ring.

In other forms of the invention the inturned end of the outer race ring carried seal ring can be eliminated and the base of the flinger can project axially inwardly beyond the inner end of the seal ring. The flinger can have an end on its flange disposed within a seating flange on the seal ring to be in closely spaced relation therefrom.

It is, then, an object of this invention to provide bearing seal constructions including relatively rotatable parts disposed in closely spaced relation to define therebetween a narrow tortuous sealing passage having open ends which are kept free from dirt or lubricant by centrifugal action of the movable portion of the seal.

A still further object of the invention is to provide seal rings for bearings which cooperate to define a labyrinth seal free from friction.

A still further object of the invention is to provide a seal construction including a rotating flinger for defining the wall of a labyrinth passage to keep the mouths of the passage free from material attempting to enter the passage.

A still further object of the invention is to provide a two-piece seal construction free from rubbing parts.

A still further object of this invention is to enhance the dirt-sealing capacity of labyrinth-type seals by providing a rotating flinger with an end portion that extends axially outward to cooperate with adjacent structure for defining a very narrow or thin self-cleaning passageway.

Other and further objects of the invention will be apparent to those skilled in the art from the following detailed description of the annexed sheet of drawings which, by way of preferred examples only, illustrate several embodiments of the invention.

On the drawing:

Figure 1 is a front elevational view of a ball bearing equipped with a seal construction according to this invention.

Figure 2 is a greatly enlarged cross-sectional view, with parts in elevation, taken substantially along the line II—II of Fig. 1.

Figure 3 is a fragmentary vertical cross-sectional view, with parts in elevation, taken through a bearing similar to that shown in Figures 1 and 2, equipped with a modified type of seal in accordance with this invention.

Figure 4 is a view similar to Figure 3 but illustrating another embodiment of a seal construction in accordance with this invention.

Figure 5 is another view similar to Fig. 3 but illustrating a still further modified seal construction according to this invention.

As shown on the drawing:

In Figures 1 and 2 the reference numeral 10 designates generally a bearing composed of an outer race ring 11 having an inner raceway 11a, an inner race ring 12 having an outer raceway 12a, and a row of ball bearings 13 riding in the raceways 11a and 12a to hold the rings 11 and 12 in spaced apart relation and against substantial relative movement in axial directions.

A ball cage 14 is provided for the ball bearings 13 and is composed of riveted-together metal rings defining open ended cylindrical sockets 14a surrounding each ball 13 in free relation, vertical flanges 14b connecting the sockets 14a, flat base portions 14c between the sockets to rigidify the structure, and downturned edges 14d on the base portions 14c for coacting with the inner race ring 12 on each side of the raceway 12a. These edges 14d ride on the raceway 12 but do not carry any load. Lubricant can pass between the edges 14d and the ring 12 to enter the raceway 12a. In addition, lubricant holes 14e can be provided through the cage at spaced intervals for free flow of lubricant into the sockets 14a.

The bearing ring 11 has beveled counterbores 11b in the ends thereof defining flared mouths for the ball chamber C between the rings 11 and 12.

The inner ends of the counterbores 11b are recessed as at 11c to provide small annular grooves.

Seal rings 15 have beaded rims 15a pressed into the grooves 11c. These seal rings 15 are adapted to be pressed through the converging mouths provided by the counterbores 11b and the rims 15a are adapted to deflect or curl inwardly to accommodate the outside diameter of the seal rings to the diameter of the counterbores as the counterbores decrease in diameter. However, immediately upon reaching the recesses 11c the deflected beads 11a will snap into the recesses to rigidly affix the seal rings to the outer race ring.

The seal rings 15 have flange portions 15b extending radially inwardly and axially outwardly from the rims 15a toward the inner race ring 12. The flanges 15b have inturned end portions 15c extending axially inwardly from the inner ends of the flanges 15b and disposed to overlie the inner race ring 12 in substantially parallel relation thereto.

Flingers 16 have base portions 16a pressed onto the inner race ring 12 and underlying the end portions 15c of the seal rings 15 so as to provide close running clearance between said end portions. The terminal edges of the bases 16a and end portions 15c are in flush relation.

The flingers 16 have flanges 16b overlying the flanges 15b of the seal rings and extending radially outward and axially inward toward the outer race ring 11. The flange portions 15b and 16b are disposed in close relation with good running clearance therebetween.

The flange portions 16b have outturned ends 16c disposed within the counterbores 11b of the outer race ring in closely spaced relation therewith so as to merely provide good running clearance therebetween. The terminal edges of the outturned portions 16b are substantially flush with the side faces of the outer race ring. The end portions 16c thus extend radially and axially outwardly from the flange portions 16b.

The seal rings 15 and their cooperating flingers 16 thus provide tortuous passages for sealing the bearing chamber C against ingress of dirt and leakage of lubricant. Any dirt attempting to enter these passages will be thrown clear from the entrance mouths by the rotating end portions 16c of the flingers. Likewise, any grease attempting to enter the other ends of the passages will be thrown away from these entrances by the rotating bases 16a of the flingers. If, by any chance, dirt does enter a passage it must travel against the centrifugal force action in the passage produced by the rotating flinger since it must flow radially inward before it can reach the chamber C. Such radially inward flow of dirt of course will not occur and the dirt will be thrown by centrifugal action back out of the passage. Any grease from chamber C which may enter the passage must flow radially outwardly before it can be discharged but since the seal rings and flingers have flanges which converge axially inwardly they impede radial discharge of the grease.

As shown by the arrows in Figure 2, grease is normally worked out of the upper end of the socket 14a by rotation of the ball 13 in the socket. This grease will slide along the flanges 15b of the seal rings and will build up on the end portions 15c of the seal rings until it flows off of the end portions whereupon it is immediately acted on by the inner edges of the flinger bases 16a and thrown toward the cage 14 away from the entrance mouths to the passages between the seal rings and flingers. Since the cage has the downturned portions 14d in close running clearance to the inner race 12, a suction action is set up which will draw this grease into the raceway 12a and socket 14a.

The seals of this invention thus enhance lubrication of the anti-friction elements 13 in the bearing assembly by actually creating a flow of grease to the anti-friction elements.

In the embodiment shown in Figure 3, parts substantially identical with parts shown and described in Figures 1 and 2 have been marked with the same reference numerals.

The bearing 10a of Figure 3 is not equipped with beveled counterbores in the outer race ring 11 thereof but, on the other hand, a seal ring 20 has a flat rim 20a pressed directly into the outer race ring 11 so that the edge of the rim is flush with the face of the ring. The seal ring 20 has a flange 20b extending from the inner end of the rim 20a in a radial inward and axial outward direction toward the inner race ring 12 where it terminates with a free edge or inner edge 20c adjacent the inner race ring.

A flinger 21 has a base 21a pressed onto the inner race ring 12 and extending under the edge 20c of the seal ring 20 to a point axially inwardly of this edge and preferably in flush relation with the inner end of the rim 20a. The flinger has a flange 21b overlying the flange 20b of the seal ring and extending radially outward and axially inward from the inner race 12. This flange 21b has an outturned rim end portion 21c disposed within the rim 20a and terminating flush with the rim. The seal ring and flinger can conveniently be pressed into and on the respective race rings so as to be disposed in close relationhip with merely good running clearance therebetween.

This seal construction provides a tortuous passageway having an axially inwardly extending portion, a radially inwardly and axially outwardly extending portion, and a second axially inwardly extending portion. The seal operates in much the same manner as the seal described in Figures 1 and 2 since dirt attempting to enter the passageway from outside of the bearing chamber C will be flung away from the entrance mouth by the edge of the flinger rim portion 21c while grease attempting to enter the passageway from inside of the bearing chamber C will be flung away from the other end of the passageway by the rotating flinger base 21a. As a result of this rotating base, grease working out of the socket 14a of the ball cage will slide along the flange 20b of the seal ring toward the edge 20c thereof whereupon the grease will drop onto the rotating base 21a and be thrown back for circulation under the cage into the socket and raceway.

If desired, a straight counterbore could be drilled into the outer race 11 to provide a shoulder for bottoming the rim 20a of the seal ring. This counterbore is not necessary since the ring can be designed so that it is properly seated when its rim edge is flush with the face of the outer race ring.

As shown in Figure 4, a bearing 10b identical with the bearing 10a described in Figure 3 has the ball chamber C sealed with a sealing ring 30 having a flat outer rim 30a pressed into the outer race ring 11 until an outturned flange 30b on this rim abuts the outer face of the bearing ring. This outturned flange will serve to limit the extent of insertion of the sealing ring into the outer race ring. The seal ring 30 has a flange portion 30c extending radially inwardly and axially outwardly from the outer race ring 11 to terminate at a free inner edge 13d above the inner race ring 12.

A flinger 31 has a base 31a pressed onto the inner race ring 12 and extending beyond the edge 30d of the seal ring into flush relation with the inner edge of the rim portion 30a of this seal ring. The flinger also has a flange 31b overlying the flange 30c and extending in parallel relation thereto to an outturned end portion 31c which is disposed inwardly of the rim portion 30a of the seal ring. The seal ring 30 and flinger 31 function in the same manner as the seal construction described in Figure 3.

The bearing 10c of Figure 5 is substantially identical with the bearings 10a and 10b described above but the outer race ring 11 after being ground on the inside diameter has annular grooves such as 40 cut into the inner face to provide seats for snap rings such as 41 which can readily be forced into the race ring to expand into the grooves.

It will, of course, be understood that while only one groove 40 and one snap ring 41 are shown, this structure is duplicated on the other side of the ball cage 14.

A retainer ring 42 is inserted in the ring 11 to be bottomed against the snap ring 41. This retainer extends radially inward into closely spaced relation with the inner race ring 12.

A sealing ring 43 is next pressed into the outer race ring 11. This sealing ring 43 has a flat outer rim 43a in press fit relation on the inner diameter of the outer race extending from flush relation with the side face of the outer race into engagement with the retainer 42. The retainer 42 is thus clamped between the snap ring and the sealing ring and need not be press fitted into the race ring 11 although a press fit can be used if desired.

The sealing ring 43 has a flange 43b extending from the inner end of the rim 43a in an axially outwardly and radially inward direction into spaced relation from the inner race ring 12. The flange 43b thus slopes away from the retainer to define therewith a pocket 44 opening toward the inner race ring.

A flinger 45 of Z-shaped cross section, similar to the flingers 21 and 31, has a base 45a pressed onto the inner race ring 12 to extend under the sealing ring flange 43b and at least partially across the pocket 44 into close relation with the inner end of the retainer 42.

A flange 45b on the flinger overlies the flange 43b of the seal ring in close parallel relation therewith and a rim, or outturned portion, 45c on the flinger is disposed inwardly of the rim portion 43a of the seal ring.

The flinger 45 and seal ring 43 cooperate in the same manner described in Figures 3 and 4. However, the seal ring 43 has the added function of cooperating with the retainer 42 to define a further trap for dirt or grease. The pocket 44 will trap any dirt that might possibly enter between the seal ring and flinger and will prevent the dirt from entering the ball chamber C since the dirt will be thrown by centrifugal force into the convergent end of the pocket away from the inner end of the retainer. Likewise any grease passing under the retainer will be trapped in the pocket as it will be thrown away from the inner end of the seal ring.

From the above descriptions it will be understood that this invention now provides seal constructions for bearings and the like which are composed of inexpensive metal rings that can be conveniently stamped so as to be press fitted into and on bearing race rings for cooperating to define a labyrinth seal. The metal rings are held in closely spaced relation preferably with a running clearance therebetween of about .0005 to .001 inch. The feature of providing an outturned end portion on a flinger flange which overlies a seal ring flange and the feature of positioning this outturned portion in closely spaced relation to an adjacent non-rotatable part greatly aids in sealing the bearings against ingress of dirt.

It will, of course, be understood that various details of the invention may be varied through a wide range without departing from the principles of this invention and it is, therefore, not the purpose to limit the patent granted hereon otherwise than necessitated by the scope of the appended claims.

I claim as my invention:

1. The combination with a pair of rings disposed one within the other and held in radially spaced apart relation and against substantial relative axial movement, of a third ring carried by the outer ring and extending radially inward and axially outward from the outer ring, a flinger carried by the inner ring, a base on said flinger extending under the third ring, a flange on said flinger outwardly of the third ring, said flange extending radially outward and axially inward from the inner ring, an axially outward extending end portion of appreciable length on said flange having a diameter at its outer end not less than the diameter at its inner end, and said flange and end portion of the flinger being positioned in closely spaced relation from adjacent ring structure for cooperating with the ring structure to seal the space between the inner and outer rings against ingress of dirt and egress of lubricant.

2. A seal construction for inner and outer rings held in radially spaced apart relation and against substantial relative movement in an axial direction and said outer ring having a counterbore sloping axially and radially inward, which comprises a third ring pressed into the outer ring and extending radially inward and axially outward toward the inner ring, an end portion on said third ring extending axially inward from the inner end thereof, a flinger having a base on the inner ring extending under said end portion of the third ring, said flinger having a flange outwardly of said third ring in closely spaced substantially parallel relation therewith, and a sloping outturned end portion on said flinger flange parallel to said counterbore in spaced sealing proximity therewith.

3. The combination with a pair of rings disposed one within the other and held in radially spaced apart relation and against substantial relative movement in an axial direction, of a third ring pressed into the outer ring and having a rim seated in said outer ring together with a flange extending inwardly from the inner end of said rim toward the inner ring, a flinger having a base pressed onto the inner ring extending under the flange of the third ring, a flange on said flinger overlying the third ring flange in closely spaced relation therewith, and an outturned portion on said flinger flange seated within the rim of the third ring in closely spaced relation therewith.

4. The combination with a pair of rings disposed one within the other and held in radially spaced apart relation and against substantial relative axial movement, and said outer ring having a counterbore sloping axially and radially inwardly from the outer face thereof together with an annular groove at the inner end of said sloping counterbore, of a third ring having a rim press fitted into said groove and a flange extending inwardly from the outer ring toward the inner ring, a flinger having a base pressed onto the inner ring and underlying the third ring, a flange on said flinger overlapping the flange of the third ring, and an outturned end portion on said flinger flange lying within said counterbore in closely spaced parallel relation therewith.

5. The combination with a pair of rings disposed one within the other and held in radially spaced apart relation and against substantial relative axial movement, and said outer ring having an annular groove in the inner face thereof spaced inwardly from the end face of the ring, of a snap ring seated in said groove, a retainer ring bottomed on the snap ring and extending inwardly into closely spaced relation with the inner ring, a sealing ring having a rim pressed into the outer ring and a flange sloping radially inward and axially outward into spaced relation with the inner ring, said seal ring being bottomed on said retainer to cooperate therewith for defining a pocket opening toward the inner ring, and a flange of Z-shaped cross section having a base pressed onto the inner ring under the seal ring and at least partially across said pocket, said flinger having a flange overlying the seal ring flange in close relation and an outturned rim within the rim of the seal ring in closely spaced relation therefrom.

6. The combination with a pair of rings disposed one within the other and held in radially spaced apart relation and against substantial relative axial movement, of a retainer carried by the outer ring and extending inwardly into closely spaced relation with the inner ring, a seal ring carried by the outer ring and extending radially inward and axially outward to cooperate with said retainer for forming a pocket opening toward the inner ring, and a flinger carried by the inner ring having a base extending partially across said pocket and a flange overlying the sealing ring in substantially parallel relation therewith together with an outturned rim at the outer end of said flange in closely spaced relation from adjacent ring structure.

7. The combination with inner and outer race rings disposed one within the other and held in radially spaced apart relation by a row of balls in the pockets of a cage adapted to receive lubricant from the inner race ring and discharge lubricant on the outer race ring, of a seal ring secured in the outer race ring and extending radially inward and axially outward therefrom toward the inner race ring, and a flinger having a base on the inner race ring extending under the inner end of the seal ring in closely spaced relation therefrom to terminate in spaced relation from said pockets of the cage, said flinger having a flange extending radially outward and axially inward toward the outer race ring and an axially outward extending end portion on said flinger flange, said flinger cooperating with adjacent ring structure to define a narrow sealing passage extending axially outward adjacent the inner race ring, thence radially outward and axially inward across the space between the inner and outer race rings and thence axially outward adjacent the outer race ring, said seal ring directing lubricant discharged from the pockets of the cage on the outer race ring to said base of the flinger, and said base throwing lubricant received thereon away from the inner end of the seal ring and thus away from the mouth of said narrow sealing passageway for flowing back to the pockets of the cage.

8. The combination with a pair of rings disposed one within the other and held in radially spaced apart relation and against substantial relative axial movement, of a third ring carried by the outer ring and extending radially inward and axially outward toward the inner ring, an end portion on said third ring extending axially inward from the inner end thereof, a flinger having a base on the inner ring extending under said end portion of the third ring to cooperate therewith for defining a narrow sealing passage extending axially outward adjacent the inner ring, said flinger having a flange outwardly of said third ring in closely spaced substantially parallel relation therewith to cooperate therewith in defining a radially outward and axially inward narrow sealing passageway communicating with the outer end of said axially outward extending narrow sealing passageway, and an outturned end portion on said flinger flange in closely spaced relation with adjacent ring structure for cooperating with the ring structure to define an outwardly extending narrow sealing passageway communicating at its inner end with said radially outward and axially inward extending narrow sealing path.

JULIUS E. SHAFER.